April 3, 1956 R. C. RIFENBURG 2,740,825
STOP FOR FLUID FILLED CABLE SYSTEMS
Filed May 20, 1952 5 Sheets-Sheet 1

INVENTOR.
Ray C. Rifenburg.
BY
Ward, Crosby & Neal
ATTORNEYS

April 3, 1956 R. C. RIFENBURG 2,740,825
STOP FOR FLUID FILLED CABLE SYSTEMS
Filed May 20, 1952 5 Sheets-Sheet 2

INVENTOR.
Ray C. Rifenburg.
BY Ward, Crosby & Neal
ATTORNEYS.

April 3, 1956   R. C. RIFENBURG   2,740,825
STOP FOR FLUID FILLED CABLE SYSTEMS
Filed May 20, 1952   5 Sheets-Sheet 3
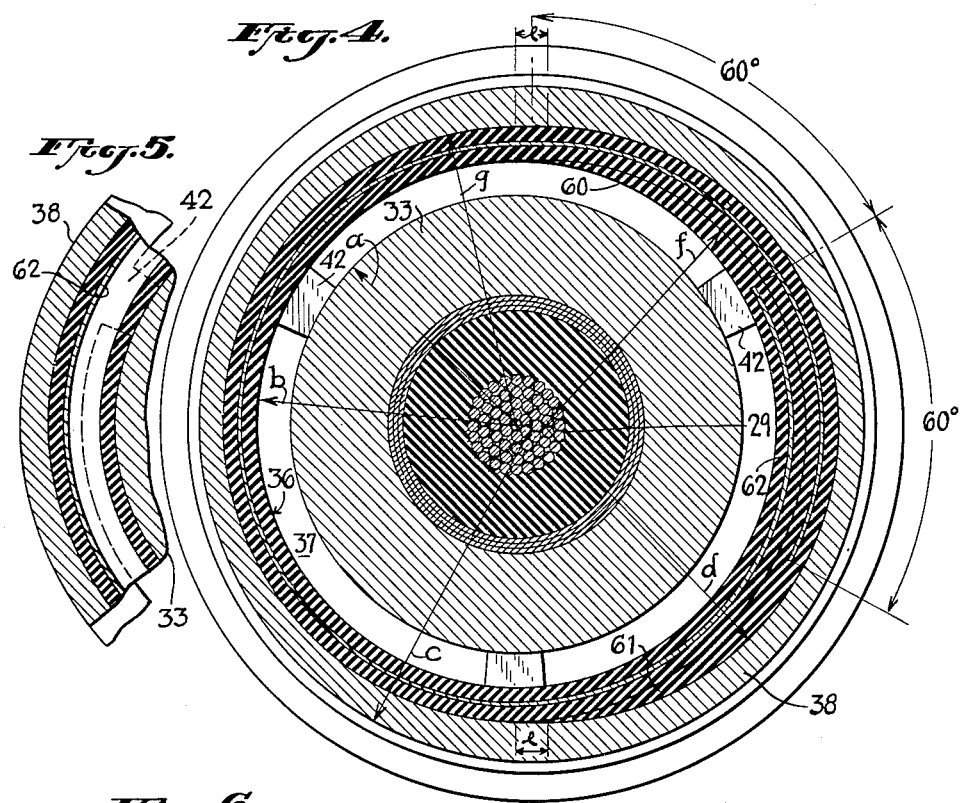
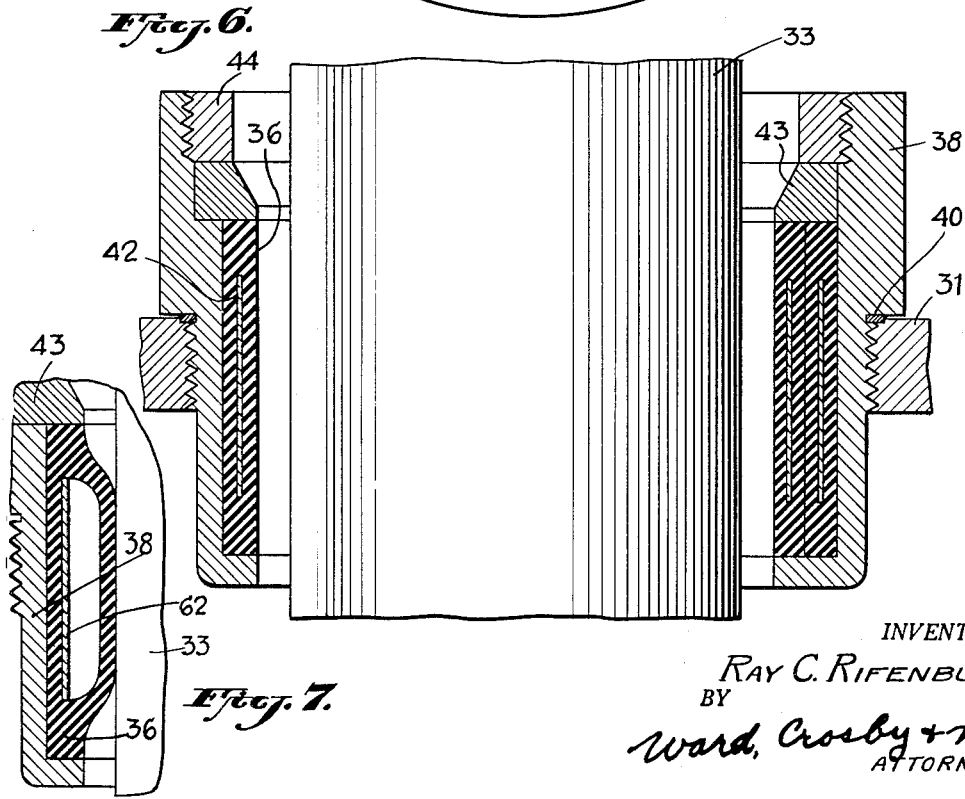
INVENTOR.
Ray C. Rifenburg.
BY Ward, Crosby + Neal
ATTORNEYS.

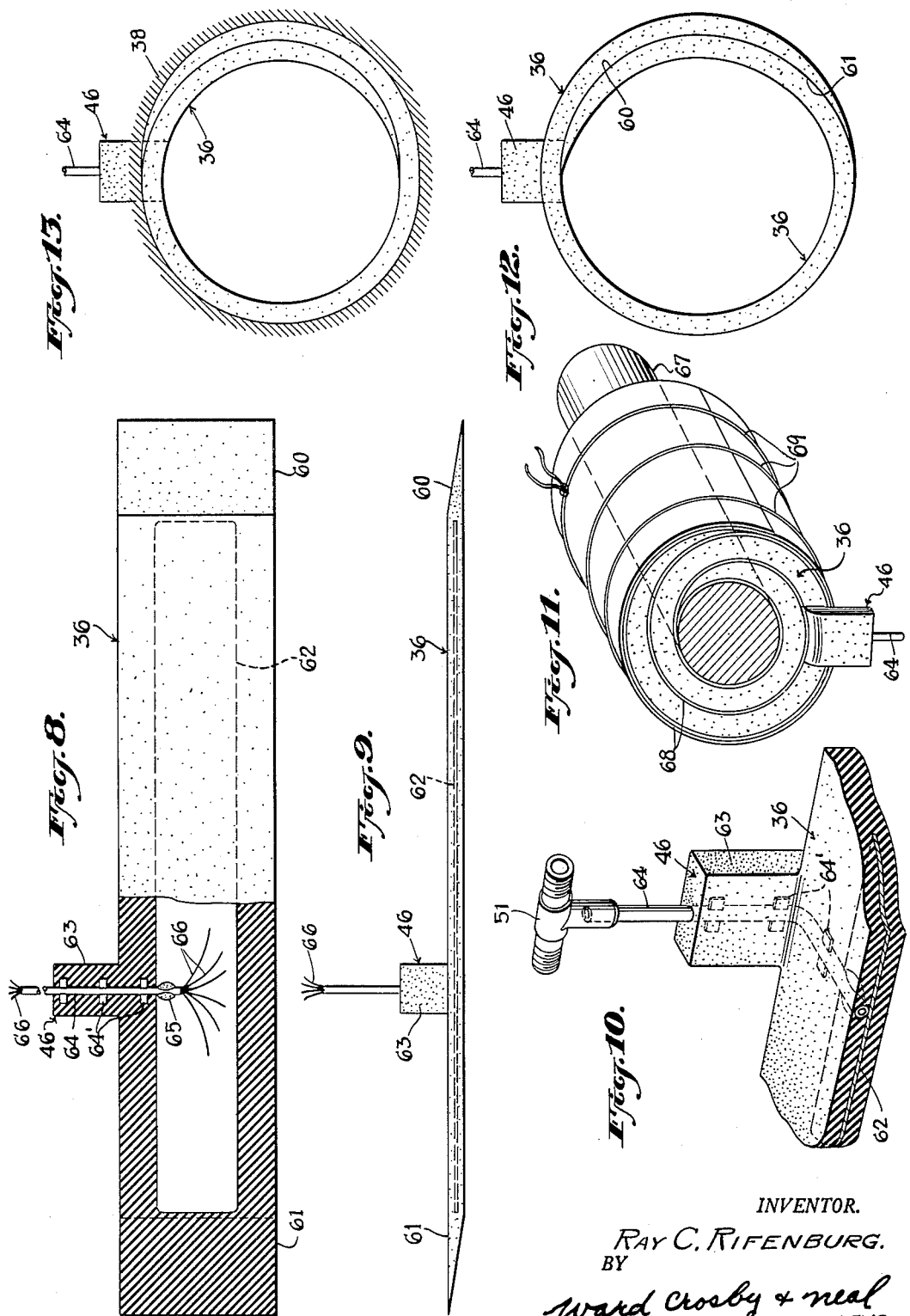

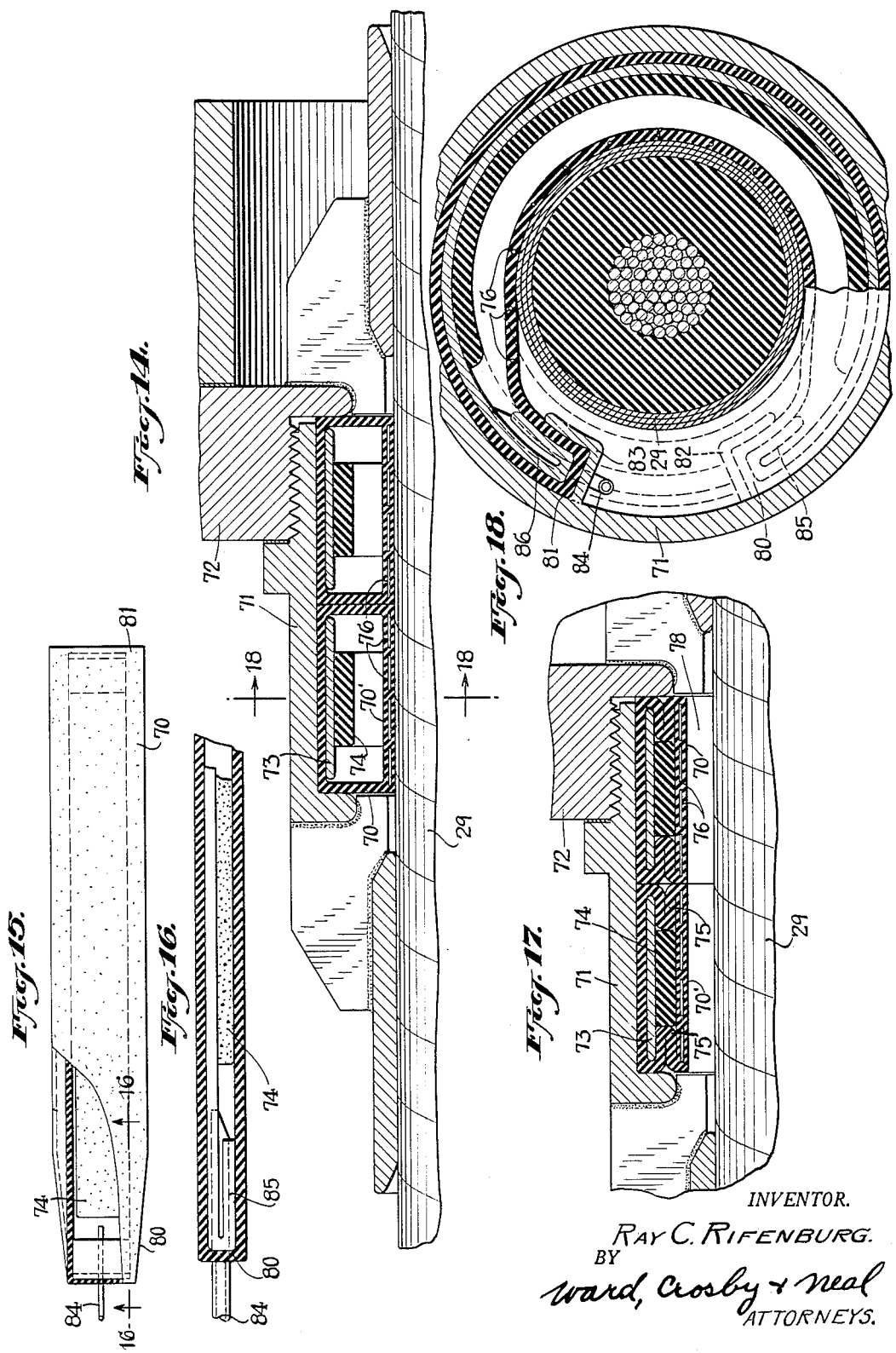

United States Patent Office 2,740,825
Patented Apr. 3, 1956

2,740,825

STOP FOR FLUID FILLED CABLE SYSTEMS

Ray C. Rifenburg, Brooklyn, N. Y., assignor to Consolidated Edison Company of New York, Inc., New York, N. Y., a corporation of New York Application May 20, 1952, Serial No. 288,894

8 Claims. (Cl. 174—23)

This invention relates to stops or barriers for cable systems in which the cables are surrounded by a conduit or pipe filled with oil or other fluid and in which it is desired temporarily to prevent the flow of the fluid from one section of the pipe to another.

In my copending application Serial No. 161,791, filed May 13, 1950 (now Patent No. 2,615,952, granted October 28, 1952), reference to which is hereby made, the general requirement and problems involved in providing such stop means are explained, and means for the purpose are disclosed in the form of a metal barrier in the conduit, having apertures for the cables, the apertures containing annular flexible diaphragms which when suitably subjected to fluid pressure, are inflated to closely embrace the cables and thereby prevent the flow of oil along same from one section of the pipe to the next. While such annular diaphragms are effective for the purpose, if they should deteriorate or become worn or injured they cannot be replaced about a cable without cutting the cable or separating same at one of its joints, which operation requires considerable time and expense. Also, for various reasons, it may be preferable to insert such diaphragms after the cables are in place and the splices therein have been made, but that practice is of course not possible if the diaphragms as disclosed in said application are in annular form to surround the cable.

The present invention provides a novel form of construction in the nature of an elongated hollow packing member which is inflatable by internal fluid pressure and which may be wound about the cable after the cable is in place in the pipe or conduit and the cable splices have all been made. That is, one and a fraction turns of the member, or a plurality of turns thereof are wound about the cable either spirally or helically, then suitably clamped in place within the aperture of the barrier through which the cable passes. Such member as wound in place and when not containing relatively high fluid pressure, is designed to provide an annular clearance space about the cable, enabling oil or other insulating fluid as used in the pipe to flow from one section to another, but when the member is subjected internally to sufficient fluid pressure, it is inflated into close and liquid-tight embracing relationship with the external surfaces of the cable, thus closing off one section of the pipe from the next.

Preferably, the inflatable member contains a spiral or helical spring which tends to maintain the member in the required shape and to keep it expanded in diameter when its interior is not subjected to relatively heavy fluid pressure, thus insuring maintenance of an open annular space about the cable.

One of the serious problems involved, however, in providing such a helical or spiral sealing or stop member, arises from the fact that when the member is inflated by internal fluid pressure to bring it into embracing relationship with the cable, the innermost portions of the member will become of reduced diameter and therefore same will tend to wrinkle upon embracing the cable, thus leaving crevices and leakage points at which oil is still free to leak past along the surface of the cable. I have found that this problem may be effectively overcome by so forming the spiral or helical member in conjunction with the spring means contained therein, that its innermost wall portions will normally be annular smooth and under substantial tension in a circumferential direction when the member is not subjected internally to such fluid pressure as is required to inflate it to sealing condition. Then when the pressure is admitted thereto, causing the internal diameter of the member to become smaller, such tension will be relieved more or less, without causing the objectionable wrinkling. A number of other troublesome problems in the manufacture and use of such devices, as hereinafter explained, are also solved by this invention, which makes possible a stop means providing a tight seal, and yet the sealing means being in such form that it may be easily inserted or removed for inspection, repair or replacement without cutting the cable or taking apart any of the cable splices.

The invention also comprehends features making possible the automatic operation of the stop means, whenever the pressure of the insulating fluid in the cable pipe line falls due to any cause such as leakage or breaking of the pipe at some point. Thus by providing the stop means, for example, at each side of each joint between sections of the cable system, losses of the insulating fluid in the pipe upon breakage or leakage, may automatically be confined to the cable section where the break or leak occurs.

Further and more specific objects, features and advantages of the invention hereof will appear from the detailed description given below taken in connection with the accompanying drawings which form a part of this specification and illustrate, by way of examples, preferred embodiments of the invention.

In the drawings:

Fig. 3 is a transverse sectional view taken substantially along line 3—3 of Fig. 2;

Fig. 4 is a greatly enlarged sectional view taken substantially along lines 4—4 of Fig. 2 and showing the inflatable sealing means in spiral form;

Fig. 5 is a further fragmentary sectional view taken along line 5—5 of Fig. 2; showing the packing means inflated.

Fig. 6 is an enlarged sectional view taken substantially along line 6—6 of Fig. 2;

Fig. 7 is an enlarged detailed sectional view showing a portion of the stop means in inflated active condition;

Fig. 8 is a plan view partly in section, showing one of the inflatable flexible stop members before it is wrapped into annular form;

Fig. 9 is a side or edge view of the member of Fig. 8;

Fig. 10 is an enlarged perspective view of the fluid inlet portion of the device of Figs. 8 and 9;

Fig. 11 is a sectional view showing the manner in which the device of Fig. 8, as formed of rubber-like material is finally vulcanized in proper shape;

Fig. 12 shows the device of Fig. 8 as finally finished ready to be inserted about a cable;

Fig. 13 is a sectional view showing the same device as inserted in place ready for use;

Fig. 14 is a sectional view showing an alternative embodiment where the inflatable member is of helical form and is shown inflated;

Fig. 15 shows the type of inflatable member used in Fig. 14 but before such member has been helically shaped;

Fig. 16 is an edge view partly in section, and partly broken away, of the device of Fig. 15;

Fig. 17 is a sectional view showing portions of Fig. 14 but with the inflatable member in collapsed condition; and Fig. 18 is a sectional view taken substantially along line 18—18 of Fig. 14.

Figure 1:
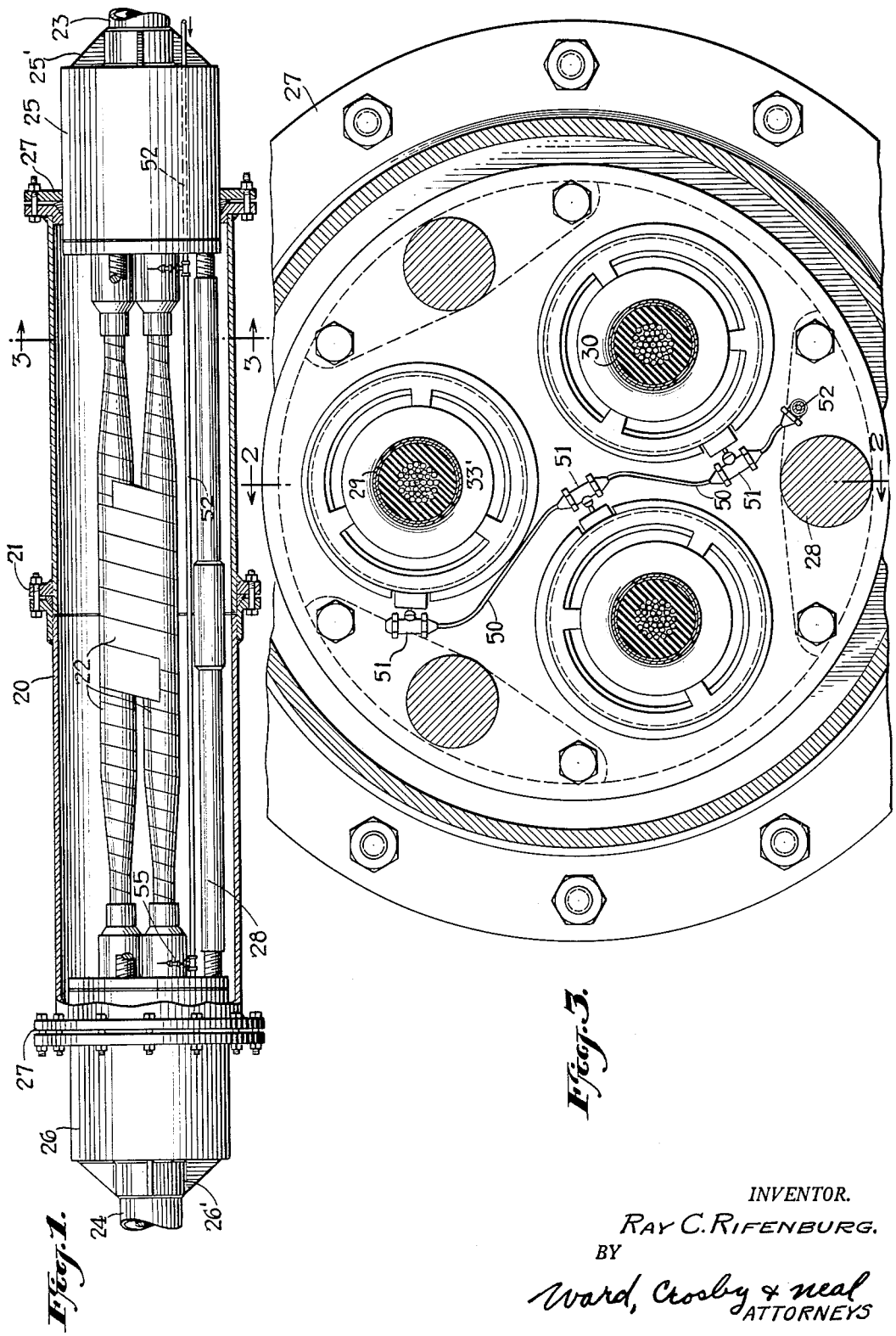
Fig. 1 is a side view, partly in section, of a typical joint construction for a cable system of the type in which the invention is adapted to be used.

Referring now to Fig. 1, a typical form of cable joint casing is shown at 20, separable at its mid portion by suitable detachable flanged coupling means 21 and containing splices as at 22 for three cables, for example, which extend through cable pipe line sections as at 23, 24. Cylindrical reducer members 25, 26 are provided within the ends, respectively, of the casing 20, the casing being sealed in respect thereto by any suitable known type of coupling means 27, for example so-called Dresser couplings. The reducer members 25, 26 are closed at their outer ends by flanged means as at 25', 26', which embrace and are suitably sealed to the pipes 23, 24 as by welding or otherwise. A plurality of rod means, one of which is shown at 28, extend between the reducer members 25, 26 and have threaded engagement with respect to these reducer assemblies for retaining them at the desired positions within the ends of the joint casing.

Figure 2:
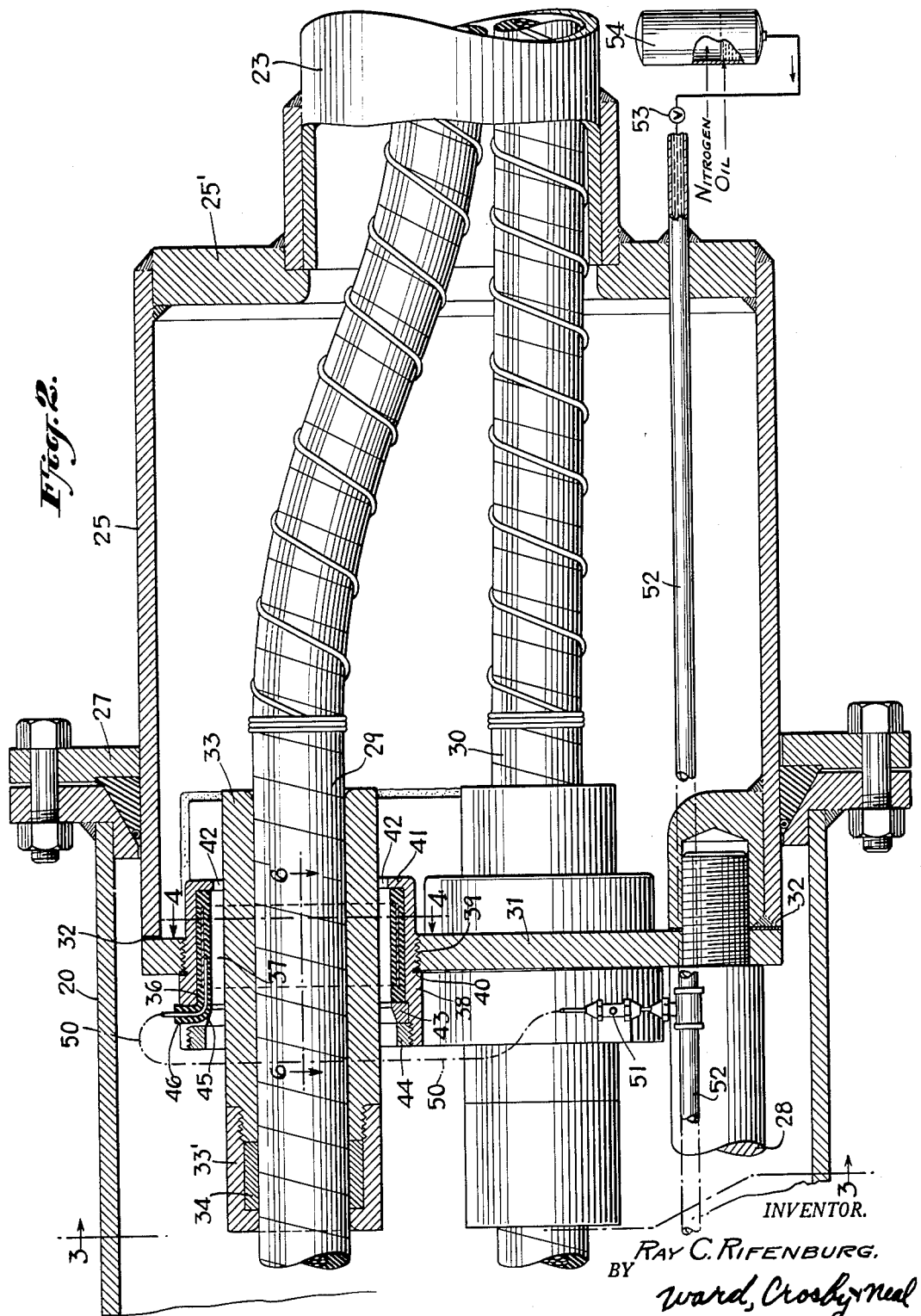
Fig. 2 is a vertical sectional view through that portion at one end of the joint which contains the essential features of the invention.

Referring now to Fig. 2, the parts contained within the reducer member 25 are here shown in further detail and including a sectional view for the stop means surrounding one of the three cables 29, and a side view of the stop means for another of the cables 30.

The inner end of the reducer member 25 is closed by a face plate 31 held in place by the rod means 28 which press the face plate up against gasket means 32 for sealing the plate with respect to the end of the member 25. It will be understood that the face plate 31 has apertures respectively through which the three cables pass and which contain the gasket stop means of the construction hereinafter described.

The gasket or stop means for surrounding the cable 29 is shown in Fig. 2 in vertical section, and it will be understood that like means are provided about each of the other cables. It will also be understood that the invention is equally applicable in cases where there may be one, two, three or more cables passing through the same pipe line, the space in which surrounding the cable sheaths is normally filled with oil for example under 200 lbs. pressure, or other suitable liquid or gaseous insulating fluid under pressure.

Each of the cables where it passes through an aperture in the face plate 31, preferably is surrounded by a bronze bushing such as at 33, threaded to another bushing member 33' containing a gasket 34 for sealing the bushing with respect to the cable sheath. Such gasket if desired to be removed and readily replaceable, may be of a two-part split form. The bushings such as at 33, 33' may be made with various wall thicknesses to accommodate cable sheaths of different diameters in the structure while using stop means of standardized dimensions to surround same, as hereinafter described, thus avoiding the necessity of manufacturing such stop means of numerous different sizes to accommodate cables of many different sizes.

The stop means per se, comprising a packing-like member, gasket, or "tire" formed of artificial rubber or rubber-like material, such as "Buna N," is shown at 36 surrounding the bushing 33 normally with annular clearance space with respect thereto, as indicated at 37. This clearance space normally allows the oil or whatever insulating fluid is used in the cable pipe line, to flow from pipe section 23 for example, through the joint casing, thence similarly through clearance space in a like stop means in reducer 26 and on into pipe section 24. Also, as hereinafter described, the stop means 36 is so constructed as to be capable of being inflated either by the pressure of a suitable liquid or gas therein, so that it will then become of reduced internal diameter and embrace under pressure the external surfaces of the bushing 33 or of the cable sheath itself if the latter is of such diameter that no bushing such as at 33 is needed. The manner in which the cross-section of the member 36 is expanded into embracing relationship with the bushing 33, is indicated by the sectional view of Fig. 7.

The member 36 preferably comprises about one and one-half turns or more if desired, spirally wound and retained within a thimble-like member 38 having threaded engagement as at 39 with the interior of the aperture therefor through the face plate 31, a suitable sealing gasket being provided at 40. As here shown, the right-hand end of the thimble 38 has an inturned flange 41 on which a number of spaced inwardly and radially extending detents 42 are formed for retaining bushing 33 in the desired position. The left-hand end of the thimble member 38 contains a ring member 43 held in place by a suitable threaded annular member 44. The ring 43 has a cut-out portion as at 45 enabling the fluid intake passage means 46 for the member 36 to extend to the interior of the thimble 38 for connection to a fluid pressure supply conduit 50.

As shown in Fig. 3, the fluid pressure supply conduit may be connected to each of the stop means as by T-couplings 51, which might also contain valves if desired. The conduit 50 is coupled into a conduit 52 which at one end extends out through the end wall 25' of the reducer member, thence through suitable valve means 53 to a tank 54. The other end of the conduit 52 may extend longitudinally through the joint casing for connection as at 55 (Fig. 1) to the stop means in the left-hand end of the casing, so that only one tank 54 needs to be used to supply pressure for operating all of the stop means in both ends of the casing.

As above indicated, in a typical case the cable pipe line may normally contain oil under pressure, for example of 200 lbs. per square inch, and normally the tank 54 may partially be filled with a gas, preferably an inert gas such as nitrogen under pressure, for example of about 35 lbs. per square inch. The remainder of the tank normally contains oil subject to such pressure as to do also the conduits 52, 50 as connected to the interiors of the gasket stop means 36, all of which are connected to the tank by these conduits. But since the annular interior surfaces of the stop means 36 surrounding the annular clearance spaces is at 37, will normally be subjected to the 200 lbs. pressure of the oil filling the cable pipe system, it will be apparent that the stop means will normally be collapsed internally, i. e. not inflated but held radially outward under pressure against the interior walls of the thimbles such as at 38, and in the condition shown in Fig. 2. In other words, the oil supply from tank 54 will normally be expelled from the interiors of the stop means 36 by reason of the pressure of 200 lbs. in the pipe line oil contained in the clearance spaces at at 37. However, if for any reason the pipe line oil pressure should fall to about 35 lbs. per sq. inch or lower, then the interior cavities within the stop means will become inflated to the condition shown in Fig. 7, thus automatically stopping the flow of oil from one pipe section to the next.

The preferred construction of the gaskets or stop means 36 and the manner of making same, will now be explained, more particularly with reference to Figs. 8–13. First, each of these members may be formed as an elongated flattened tube closed at its ends 60, 61, by portions tapered in the manner shown in Figs. 8 and 9, and the cavity in the tube being filled by a ribbon 62 of springy metal. This tube may be formed by superposing two strips of the Buna N or other vulcanizable artificial rubber, with the metal ribbon 62 in position therebetween. To form the pressure inlet means 46 the strips of vulcanizable material may be formed with superposed tabs as at 63, with a brass tube 64 inserted therebetween and opening into the crevice just above or below the metal strip 62. The tube 64 may be welded as at 65 to one surface of the strip 62. Also this tube may have wing formations 64' on its sides for engagement between the two layers of vulcanizable material.

The assembly as shown in Figs. 8 and 9 is first preliminarily and only partially vulcanized in a mold of a suitable shape to receive the same. The surface of the metal strip or ribbon 62 before being put in place between the layers of the vulcanizable material, is coated for example with soap and water so that they will not adhere to the material to be vulcanized. Thus after the device is completed fluid pressure introduced through the tube 64 will be free to extend over either one or both surfaces of the strip 62 to cause inflation of the assembly. To prevent the inner end of tube 64 from being closed off during the vulcanization, a number of wires as at 66 may be passed through the tube to extend out over the metal member 62, these wires being withdrawn after the assembly in the shape shown in Figs. 8 and 9 has been preliminarily vulcanized for a short period but long enough to give the assembly a preliminary "set," then it is removed from the mold and the portion 46 may be bent up at right angles as shown in Fig. 10.

The member 36 is next wrapped (Fig. 11) firmly about a mandrel 67 with layers of paper 68 between the turns thereof and covering the exterior. As thus wrapped, it is bound in place as by strings 69 and then subjected to the final vulcanizing treatment. A mandrel 67 is preferably selected of a diameter somewhat smaller than the diameter of the cable sheath about which the member 36 is to be used, or at least the mandrel should be no larger than such cable sheath. This will insure that the inner surfaces of the member 36 as eventually used will be free of wrinkles. Then after the member 36 is released and unwrapped from the mandrel 67 the spring member 62 therein will cause it to expand substantially in diameter and to approximately the shape shown in Fig. 12, wherein it will be noted that the overlap of the spiral formation amounts to about 180°. The layers indicated at 68 in Fig. 11 will have slipped on each other in expanding to the positions shown in Fig. 12. In this condition the vulcanized material will be under substantial tension circumferentially. Then when the member 36 is placed into the thimble means 38 as shown in Fig. 13, its overall diameter will be reduced somewhat and the spring means 62 therein will serve to hold it expanded against the interior walls of the thimble means, but with the inner vulcanized wall surfaces still under circumferential tension.

To insure best results the member 36 and the parts which cooperate therewith are preferably quite accurately shaped and proportioned in the manner shown by the enlarged cross-sectional view of Fig. 4. Here, as indicated by the arrow $a$, the external surface of the bushing 33 is concentric with the cable 29, as is also the inner surface of the member 36, as indicated by the arrow $b$. This insures that the annular clearance space 37 for the normal flow of oil from one pipe section to another will be uniform all around the cable. However, to accommodate the overlapped portions of the member 36, the external surface of the thimble-like member at the section shown in Fig. 4, is made eccentric with respect to the cable as indicated by the arrow $c$, and the interior surface portions of the member 38 which contact with the overlapped portions of the member 36 are made still more eccentric with respect to the cable, as indicated by the arrow $d$. Narrow portions indicated by the arrows $e$ on the interior surfaces of member 38 are made flat along the end positions of the tapered tip portions 60, 61 of the member 36.

As indicated by the arrow $f$, the contacting overlapping surfaces of member 36 are made concentric with the adjacent internal surface portions of member 38 over a distance corresponding to about 90°, whereas the remainder of the inner surface of the outer turn of the member 36 (for about 270°) is preferably made concentric with the cable as indicated by the arrow $g$. As further indicated in Fig. 4, the end portions of spring member 62 preferably overlap by about 60° and the tapered end portions of the member 36 extend for about 60° beyond the ends of the spring member 62.

With the alternative embodiment of the invention shown in Figs. 14–18, the inflatable stop means 70 comprises one and a fraction turns of a vulcanized elongated hollow member, the turns being wound helically or side by side instead of being wound spirally, as in the above described embodiment where one turn portion was superposed on another. The member 70 may be received in a thimble-like member 71 having threaded engagement in the cable aperture of a face plate 72, as shown in Figs. 14 and 17. The member 70 contains a spring 73 similar to a clock spring but of helical shape. In order that the turns of the member 70 will be held in proper relationship by this spring, the spring is preferably made so that it tends to assume the shape of a helix wound in the direction opposite from the direction of winding of the turns of the member 70. As best shown in Fig. 17, the inner central portion of the spring 73 is either accompanied by a suitable cushioning strip 74 or formed with a thickened portion such as indicated in cross-section at 74, so that when the member 70 is not inflated by internal pressure its edge walls will assume folded or collapsed positions as indicated at 75. The inner wall surface 70' of the member 70 preferably has embodied therein a series of small rods or wires as at 76, a row of such wires being positioned at spaced points about the cable and within the vulcanized wall for the purpose of maintaining such wall in substantially cylindrical shape when the stop member is either inflated or not inflated. This will insure that a uniform clearance space as at 78 will remain about the cable to by-pass the oil under pressure from one pipe section to the next of the cable system when the stop means is not inflated.

As indicated in Figs. 15, 16 and 18, the member 70 may be initially formed as a vulcanized tube of artificial rubber and of rectangular cross-section, whereupon spring 73 together with the cushion means or the like 74 are inserted therein and then the ends of the tube are sealed as indicated at 80, 81. After the member 70 is wound into place its sealed ends may be retained by angle shaped portions 82, 83 affixed to the interior of member 71. The end 80 for example may be provided with a fluid pressure inlet tube 84. To form a rigid internal support for the walls of the member 70 at the ends thereof the spring ends may be bent back upon themselves as at 85, 86.

In other respects the construction and operation of the embodiment of Figs. 14–18 will be apparent from studying the above description of the spirally wound embodiment.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Packing means adapted for use as a fluid stop about a cable contained in a fluid filled pipe or the like, such packing means being removable without severing the cable and being formed of an elongated stretchable vulcanized member having a passage extending along within its length, such passage communicating with a fluid pressure connection to permit inflation of the member and the member being vulcanized in a normally generally annular shape comprising at least one turn, the ends of which circumferentially overlap, spring means in the member acting to retain the vulcanized material forming the interior surface of such turn normally under tension in a circumferential direction whereby, when the member is inflated and expanded inwardly of such turn to embrace the cable passing therethrough, such tension will be reduced substantially before any tendency of compressing and consequent wrinkling of such surface occurs.

2. Packing means formed of an elongated stretchable vulcanized member having a passage extending along within its length, such passage communicating with a fluid pressure connection to permit inflation of the member and the member being vulcanized in a normally generally annular shape comprising at least one turn, the ends of which circumferentially overlap, and spring means associated with said member for normally retaining the vulcanized material forming the interior surface of such turn under tension in a circumferential direction whereby, when the member is confined on its exterior and inflated and thereby expanded inwardly of such turn to embrace a member passing therethrough, such tension will be reduced substantially before any tendency of compressing and consequent wrinkling of such surface occurs.

3. A stop construction for temporarily preventing the flow of fluid from one section to another of a cable arrangement of the type having at least one cable contained within a pipe or the like filled with the fluid, such stop comprising rigid barrier means having an aperture therethrough for permitting the cable normally to pass through with clearance space about same, a generally annular packing means retained in such aperture, spring means within such packing means normally tending to expand same whereby said clearance space is normally left open, such packing means constituting an elongated inflatable member, more than one turn of which is wrapped about within the aperture, and a fluid pressure connection to the interior of such inflatable member.

4. Packing means formed of an elongated stretchable vulcanized member tapered at its ends and having a passage extending along within its length, such passage communicating with a fluid pressure connection to permit inflation of the member and the member being vulcanized in a normally generally annular shape comprising at least one turn the ends of which are superposed and circumferentially overlap, and a flat spring strip normally substantially filling said passage and normally retaining the material of such member under circumferential tension.

5. In a cable system wherein the cables are contained in fluid filled pipe sections connected by joint casings through which casings the fluid is normally free to flow from one pipe section to the next, stop means for automatically preventing such flow upon substantial reduction of the pressure of such fluid, such stop means comprising a rigid barrier having apertures therethrough for permitting the cables normally to pass through the clearance spaces about the same, inflatable packing means within said apertures and normally of a size and shape to leave such clearance spaces open, a tank containing fluid under lower pressure than the normal pressure of the fluid in said pipe sections, conduit means maintaining said tank in communication with said inflatable packing means to subject same internally to the fluid pressure in the tank and whereby, when the fluid pressure in the pipe sections falls below the fluid pressure in the tank, the latter pressure will cause said packing means to be inflated to seal off said clearance spaces.

6. In a cable system wherein the cables are contained in fluid filled pipe sections connected by joint casings through which casings the fluid is normally free to flow from one pipe section to the next, stop means for automatically preventing such flow upon substantial reduction of the pressure of such fluid, such stop means comprising a rigid barrier within a joint casing and having apertures therethrough for permitting the cables normally to pass through with clearance spaces about the same, inflatable packing means within said apertures and normally of a size and shape to leave such clearance spaces open, a tank at least partially filled with gas under a lower pressure than the normal pressure of the fluid in said pipe sections, conduit means containing liquid and maintaining the gas pressure in said tank in communication with said inflatable packing means to subject same internally to the pressure in the tank and whereby, when the fluid pressure in the pipe sections falls below the pressure in the tank, the latter pressure will cause said packing means to be inflated to seal off said clearance spaces.

7. Method for forming inflatable generally annular packing means of the class described which comprises, first forming an elongated member of partially vulcanized material having a passage adapted to contain inflating fluid extending along within its length and also containing a spring means which normally of itself will assume a spiral shape, then wrapping same to an annular formation of a diameter substantially smaller than the desired diameter of the finished packing, completing the vulcanization while the member is retained thus wrapped, then releasing the member to allow same to assume the desired larger generally annular formation by reason of the resiliency of the spring means therein.

8. Method for forming inflatable generally annular packing means of the class described which comprises, first forming an elongated member of vulcanizable material having a passage adapted to contain inflating fluid extending along within its length, said member also containing a spring means which normally will assume a spiral shape, of a size adapted to be contained within the finished generally annular packing, partially vulcanizing such member, then wrapping same to an annular formation of a diameter smaller than the desired diameter of the finished packing, completing the vulcanization while the member is retained thus wrapped, then releasing the member to allow the same to assume the desired larger generally annular formation by reason of the resiliency of the spring means therein acting to circumferentially tension the vulcanized material.

References Cited in the file of this patent

UNITED STATES PATENTS

| 6,974 | Moat | Dec. 25, 1849 |
| 58,469 | Parker | Oct. 2, 1866 |
| 126,953 | Harris | May 21, 1872 |
| 943,023 | Johnson | Dec. 14, 1909 |
| 1,039,316 | Noack | Sept. 24, 1912 |
| 1,536,080 | Davidson | May 5, 1925 |
| 1,918,036 | Hilliard | July 11, 1933 |
| 1,947,481 | Mayer | Feb. 20, 1934 |
| 2,162,104 | Mosher | June 13, 1939 |
| 2,260,850 | Brazier et al. | Oct. 28, 1941 |
| 2,309,658 | Miller | Feb. 2, 1943 |
| 2,468,773 | Musinski | May 3, 1949 |
| 2,474,790 | Rossman | June 28, 1949 |
| 2,540,898 | Macardier | Feb. 6, 1951 |
| 2,540,932 | Clark | Feb. 6, 1951 |
| 2,584,501 | Roberts | Feb. 5, 1952 |

FOREIGN PATENTS

| 155 | Great Britain | of 1865 |